United States Patent
Harada et al.

(10) Patent No.: US 10,757,637 B2
(45) Date of Patent: Aug. 25, 2020

(54) USER TERMINAL, RADIO BASE STATION, AND RADIO COMMUNICATION METHOD

(71) Applicant: NTT DOCOMO, INC., Tokyo (JP)

(72) Inventors: Hiroki Harada, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 22 days.

(21) Appl. No.: 15/756,115

(22) PCT Filed: Aug. 29, 2016

(86) PCT No.: PCT/JP2016/075144
§ 371 (c)(1),
(2) Date: Feb. 28, 2018

(87) PCT Pub. No.: WO2017/038741
PCT Pub. Date: Mar. 9, 2017

(65) Prior Publication Data
US 2018/0249400 A1    Aug. 30, 2018

(30) Foreign Application Priority Data

Sep. 1, 2015  (JP) ................................ 2015-172282
Feb. 4, 2016  (JP) ................................ 2016-019624

(51) Int. Cl.
*H04W 48/16* (2009.01)
*H04W 56/00* (2009.01)
(Continued)

(52) U.S. Cl.
CPC ......... *H04W 48/16* (2013.01); *H04J 11/0073* (2013.01); *H04J 11/0076* (2013.01);
(Continued)

(58) Field of Classification Search
None
See application file for complete search history.

(56) References Cited

U.S. PATENT DOCUMENTS 3,666,889 A * 5/1972 Zegers ................. H04B 14/062
                                                370/479
6,480,558 B1 * 11/2002 Ottosson .............. H04B 1/7083
                                                375/350
(Continued)

FOREIGN PATENT DOCUMENTS

WO        2013133682 A1    9/2013

OTHER PUBLICATIONS

International Search Report of the International Searching Authority issued in PCT/JP2016/075144 dated Oct. 25, 2016 (2 pages).
(Continued)

*Primary Examiner* — Bunjob Jaroenchonwanit
(74) *Attorney, Agent, or Firm* — Osha Liang LLP

(57) ABSTRACT

According to the present invention, the processing load required for a cell search can be reduced even if communication is carried out with a communication system that has a plurality of parameter sets that configure radio frames. A user terminal is provided which is configured to carry out communication with a communication system having a plurality of parameter sets that respectively configure radio frames, the user terminal including a receiving section configured to receive synchronization signals transmitted from the communication system, and a control section configured to control a cell search based on the received synchronization signals. A signal configuration of each synchronization signal transmitted from the communication system is the same, without depending on a parameter set that configures a radio frame.

14 Claims, 10 Drawing Sheets

(51) Int. Cl.
  *H04W 48/12* (2009.01)
  *H04W 48/18* (2009.01)
  *H04J 11/00* (2006.01)
  *H04W 88/06* (2009.01)

(52) U.S. Cl.
  CPC ......... *H04J 11/0079* (2013.01); *H04W 48/12* (2013.01); *H04W 48/18* (2013.01); *H04W 56/00* (2013.01); *H04W 56/001* (2013.01); *H04W 88/06* (2013.01)

(56) References Cited

U.S. PATENT DOCUMENTS

| | | | | |
|---|---|---|---|---|
| 9,883,495 | B2* | 1/2018 | Papasakellariou | H04L 5/0053 |
| 2009/0046671 | A1* | 2/2009 | Luo | H04J 11/0069 370/336 |
| 2009/0046672 | A1* | 2/2009 | Malladi | H04L 1/0067 370/336 |
| 2010/0135257 | A1* | 6/2010 | Higuchi | H04J 11/0076 370/336 |
| 2011/0103534 | A1* | 5/2011 | Axmon | H04J 11/0069 375/371 |
| 2011/0188465 | A1* | 8/2011 | Han | H04B 7/2628 370/329 |
| 2011/0274026 | A1* | 11/2011 | Huang | H04J 11/0069 370/312 |
| 2012/0093267 | A1* | 4/2012 | Zhou | H04W 56/00 375/343 |
| 2013/0203419 | A1* | 8/2013 | Siomina | H04W 36/18 455/437 |
| 2013/0244640 | A1* | 9/2013 | Viorel | H04W 56/0005 455/422.1 |
| 2014/0056247 | A1* | 2/2014 | Bharucha | H04W 72/0426 370/329 |
| 2014/0126568 | A1* | 5/2014 | Berggren | H04W 56/0015 370/350 |
| 2014/0133478 | A1* | 5/2014 | Malladi | H04B 1/713 370/350 |
| 2015/0016239 | A1* | 1/2015 | Yi | H04J 11/003 370/201 |
| 2015/0256307 | A1* | 9/2015 | Nagata | H04W 28/22 370/328 |
| 2015/0365831 | A1* | 12/2015 | Ko | H04L 5/0053 370/329 |
| 2016/0330703 | A1* | 11/2016 | Shim | H04W 56/001 |
| 2016/0345250 | A1* | 11/2016 | Agyapong | H04W 48/16 |
| 2018/0041991 | A1* | 2/2018 | Lee | H04L 5/0053 |
| 2018/0310294 | A1* | 10/2018 | Goto | H04W 72/0446 |
| 2018/0324774 | A1* | 11/2018 | You | H04L 5/0053 |
| 2018/0359790 | A1* | 12/2018 | Ingale | H04W 8/24 |
| 2019/0014547 | A1* | 1/2019 | Kim | H04J 11/0093 |
| 2019/0246366 | A1* | 8/2019 | Sadeghi | H04W 56/001 |
| 2019/0274148 | A1* | 9/2019 | Xiong | H04L 1/1854 |
| 2019/0394764 | A1* | 12/2019 | Deng | H04W 72/046 |

OTHER PUBLICATIONS

Written Opinion of the International Searching Authority issued in PCT/JP2016/075144 dated Oct. 25, 2016 (4 pages).
3GPP TS 36300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).
Extended European Search Report issued in the counterpart European Patent Application No. 16841773.1, dated Mar. 4, 2019 (8 pages).
Communication Pursuant to Article 94(3) EPC issued in the counterpart European Patent Application No. 16841773.1, dated Dec. 4, 2019 (6 pages).

* cited by examiner

USER TERMINAL, RADIO BASE STATION, AND RADIO COMMUNICATION METHOD

TECHNICAL FIELD

The present invention relates to a user terminal, a radio base station and a radio communication method in a next-generation mobile communication system.

BACKGROUND ART

In a UMTS (Universal Mobile Telecommunications System) network, long-term evolution (LTE) has been standardized for the purpose of further increasing high-speed data rates and providing low delay, etc. (non-patent literature 1). For the purpose of achieving further broadbandization and higher speed from LTE, LTE advanced (which is called LTE Rel. 10 through 12) have been formally specified, and successor systems (also called LTE Rel. 13 and 5G ($5^{th}$ Generation Mobile Communication System) thereto have also been studied.

In 5G, compatibility for even higher speed and higher volume communication is demanded. Therefore, in 5G, in addition to the frequency band used in LTE Rel. 12, use of a higher frequency is being studied. Furthermore, in 5G, implementation of new radio access technology (5G New RAT (Radio Access Technology)) is being studied.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall description; Stage 2".

SUMMARY OF INVENTION

Technical Problem

In RAT (5G RAT) which is being studied for implementation in 5G, changing (e.g., by a constant factor) the parameter set (e.g., sub-carrier spacing, bandwidth, symbol length, etc.) that configures the LTE radio frame based on the LTE RAT design is being studied. Furthermore, in 5G RAT, it is assumed that one or a plurality of communication systems have a plurality of parameter sets that configure radio frames, and that communication is carried out with a user terminal. In such a case, it is assumed that synchronization signals that configure different signals in accordance with a parameter set that configures a radio frame is transmitted to the user terminal.

However, in the case where the user terminal receives synchronization signals having a different signal configuration per parameter set that configures a radio frame, it is necessary to carry out a cell search based on the synchronization signals of each signal configuration. Accordingly, a situation may occur where an increased processing load on the user terminal is required for the cell search.

The present invention has been devised in view of the above discussion, and it is an object of the present invention to provide a user terminal, a radio base station and a radio communication method which can reduce the processing load required for a cell search even if communication is carried out with a communication system that has a plurality of parameter sets that configure radio frames.

Solution to Problem

According to the user terminal of an aspect of the present invention, a user terminal is provided, which is configured to carry out communication with a communication system having a plurality of parameter sets that respectively configure radio frames, the user terminal including a receiving section configured to receive synchronization signals transmitted from the communication system, and a control section configured to control a cell search based on the received synchronization signals. A signal configuration of each synchronization signal transmitted from the communication system is the same, without depending on a parameter set that configures a radio frame.

Technical Advantageous of Invention

According to the present invention, the processing load required for a cell search can be reduced even if communication is carried out with a communication system that has a plurality of parameter sets that configure radio frames.

DESCRIPTION OF EMBODIMENTS

In CA for successor systems to LTE (LTE Rel. 10 through 12), the number of CCs that can be configured per user terminal is limited to a maximum of 5. On the other hand, in even further successor systems to LTE, such as LTE Rel. 13 onwards, enhanced carrier aggregation (also called "CA enhanced/enhanced CA, etc.), is being studied, which eases the limit on the number of CCs that can be configured per user terminal to configuring 6 or more CCs (cells).

In addition, in LTE Rel. 13 onwards (5G), which are even further successor systems to LTE, implementation of new radio access technology (5G (New) RAT) has been studied. It is assumed that conventional LTE RAT and 5G RAT coexist with 5G.

Figure 1A:
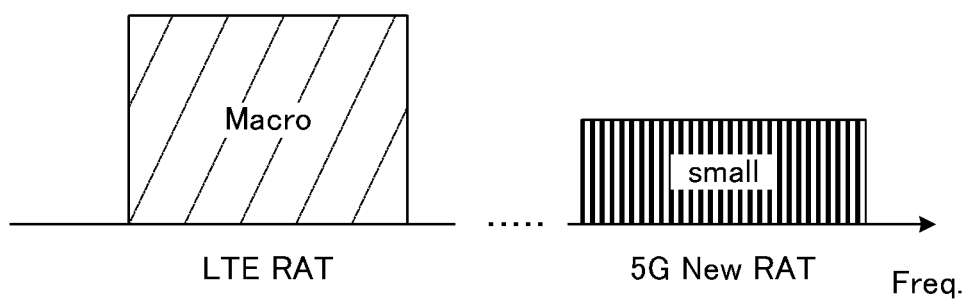
FIG. 1A is a schematic diagram showing an example of a radio resource allocation of LTE RAT and 5G RAT.
Figure 1B:
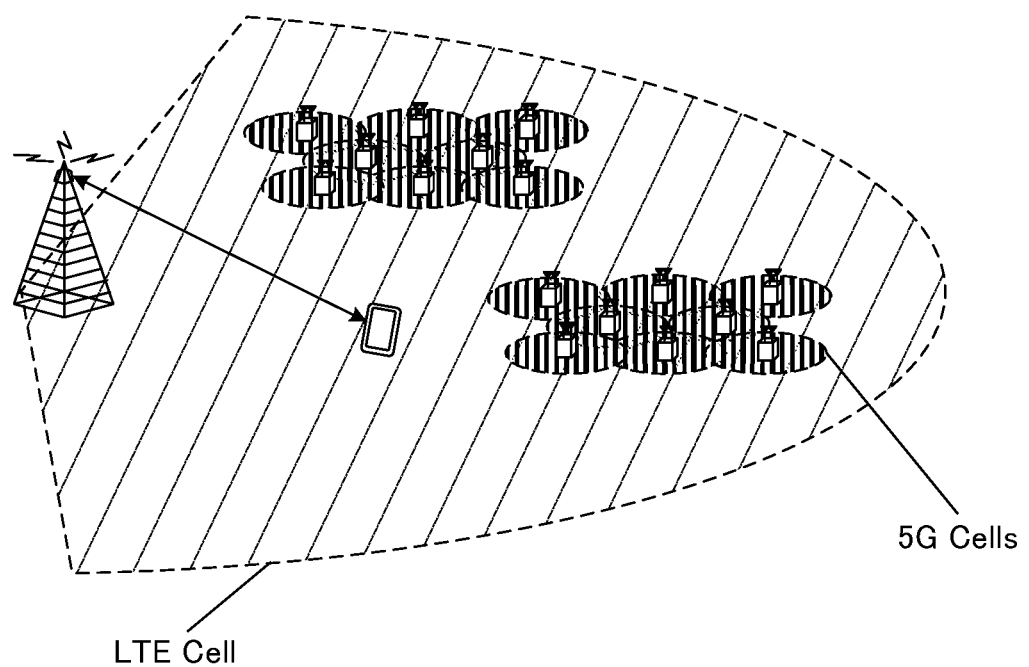
FIG. 1B is a schematic diagram showing an example of another radio resource allocation of LTE RAT and 5G RAT.

FIG. 1 is a schematic diagram showing an example of a radio resource allocation of LTE RAT and 5G RAT. In 5G, e.g., as shown in FIGS. 1A and 1B, it is assumed that LTE RAT is applied to a macro cell having a relatively wide coverage and that 5G RAT is applied to a small cell having a relatively low coverage. In such a case, it is assumed that the small cell to which 5G RAT is applied is overlaid onto the macro cell to which LTE RAT is applied.

Furthermore, in 5G RAT, a method is being studied which uses parameters (e.g., sub-carrier spacing, bandwidth, symbol length, etc.), which configure an LTE radio frame, multiplied by a constant factor (e.g., multiplied by N, or multiplied by 1/N) based on the design (numerology) of the LTE RAT. "Numerology" refers to a signal design in the RAT. Each parameter set that characterizes the RAT design is indicated according to such numerology. It is conceivable for 5G to support different numerologies in accordance with required conditions for each type of usage. For example, it is conceivable to support a plurality of numerologies having different symbol lengths and sub-carrier spacings, etc., and to coexist within 5G RAT.

For example, in 5G RAT, the sub-carrier spacing and the bandwidth that are based on LTE RAT can be multiplied by a factor of N and the symbol length can be multiplied by a factor of 1/N. Due to such a configuration, since, e.g., the TTI (Transmission Time Interval) length can be shortened, the time taken for transmission and reception can be shortened, so that low latency can be easily achieved.

Furthermore, in another example, it is conceivable for the sub-carrier spacing and the bandwidth to be multiplied by a factor of 1/N, and the symbol length to be multiplied by a factor of N. Due to such a configuration, since the entire length of the symbols increases, even in the case where the proportion of the CP (Cyclic Prefix) length, which occupies the entire length of the symbols, is constant, the CP length can be lengthened. Accordingly, a stronger (robust) radio communication with respect to a phasing communication path becomes possible.

However, a cell search in LTE RAT is carried out by receiving a synchronization signal. A PSS (Primary Synchronization Signal) and an SSS (Secondary Synchronization Signal) are used as synchronization signals. These synchronization signals are scheduled to downlink predetermined radio resources. The user terminal detects the 5 ms timing of the cell and the cell ID within the cell group (cell identification signal) (3 alternatives) by receiving a PSS. Furthermore, the user terminal detects the relative position of the SSS and the PSS (frame timing), the cell ID group (168 alternatives), the CP length (2 alternatives), and the duplex mode (2 alternatives) by receiving an SSS.

Furthermore, after the user terminal has recognized and synchronized a cell by conducting a cell search, the user terminal can obtain information on the bandwidth, etc., of the connected cell by obtaining cell system information via an MIB (Master Information Block) or an SIB (System Information Block). Furthermore, the downlink reception signal power (RSRP (Reference Signal Received Power) of the detected cell can be measured by using a downlink reference signal (CRS (Cell-specific Reference Signal) or CSI-RS (Channel State Information-Reference Signal)) transmitted from the detected signal. A "DRS" (Discovery Reference Signal) can be referred to as a generic term for PSS, SSS and CRS, or PSS, SSS, CRS and CSI-RS.

Figure 2A:
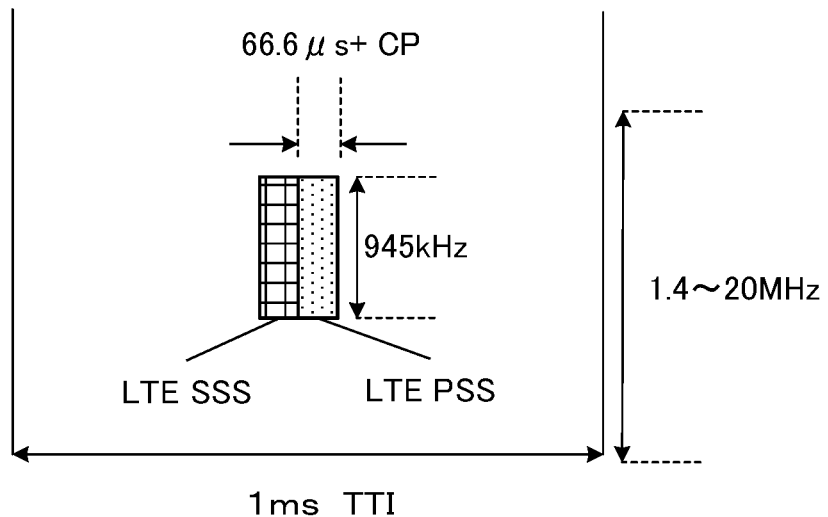
FIG. 2A is a schematic diagram of PSS/SSS scheduling in LTE RAT.

FIG. 2 shows schematic diagrams of differences in synchronization signals using numerology. FIG. 2A is a schematic diagram of PSS/SSS (synchronization signal) scheduling in LTE RAT. As shown in FIG. 2A, the PSS/SSS in LTE RAT is scheduled in the center of the system bandwidth at a bandwidth of 945 kHz, which is a sampling rate of 1920 kHz, and is not scheduled according to the system bandwidth.

Figure 2B:
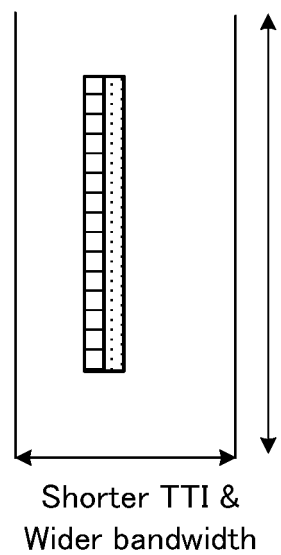
FIG. 2B is a diagram showing an example of scheduling of synchronization signals in 5G.
Figure 2C:
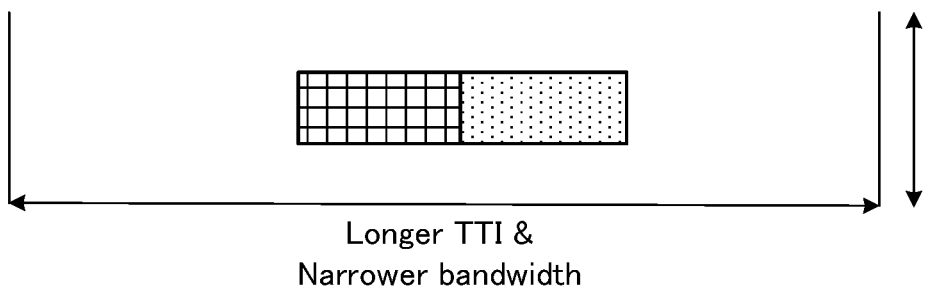
FIG. 2C is a diagram showing another example of scheduling of synchronization signals in 5G.

Whereas, FIGS. 2B and 2C each show an example of scheduling a synchronization signal in 5G. For example, FIG. 2B shows an example of a synchronization signal having a shorter TTI and wider bandwidth that those of a convention LTE. Furthermore, FIG. 2C shows an example of synchronization signal having a longer TTI and a narrower bandwidth than those of a conventional LTE RAT. These are 5G RAT examples, and compared to LTE RAT, the configuration parameters are multiplied by a factor of N or 1/N.

Hence, it is possible for synchronization signals having a plurality of numerologies having different TTI lengths and bandwidths to coexist within 5G. As described above, in the case where the synchronization signal differs for each numerology, it is necessary for the user terminal to carry out a cell search that includes the detection of synchronization signals corresponding to respective numerologies.

However, if a 5G RAT has a configuration that transmits different synchronization signals for each numerology, it is necessary for the user terminal to carry out a cell search based on synchronized signals of a plurality of numerologies. Accordingly, a situation occurs in which the processing load in the user terminal increases.

Consequently, the inventors of the present invention discovered that designing the same signal configuration for 5G RAT synchronization signals rather than according to a parameter set configuring a radio frame, enables a reduced processing load in the user terminal, thereby arriving at the present invention.

In other words, the essential feature of the present invention is to configure the same signal configuration for synchronization signals transmitted from one or a plurality of communication systems, which have a plurality of parameter sets that configure radio frames, rather than according to a parameter set (numerology) that configures a radio frame in a communication system, and the user terminal can control a cell search based on such synchronization signals.

According to the present invention, even in the case where the parameter set (numerology) that configures a radio frame is different, the signal configuration can use the same synchronization signal to synchronize with a communication system. Accordingly, it is unnecessary to detect the synchronization signals of a different signal configuration for each numerology, so that the processing load required for carrying out a cell search can be reduced.

A plurality of embodiments pertaining to the present invention will be described hereinbelow. Note that in each of the following embodiments, it is assumed that the user terminal has a function for carrying out a cell search on a cell to which LTE RAT is applied (hereinafter, "LTE RAT cell") and on a cell to which 5G RAT is applied (hereinafter, "5G RAT"). Accordingly, the user terminal can simultaneously connect to an LTE RAT cell and a 5G RAT cell.

Furthermore, in the below-described embodiments, the same signal configuration for synchronization signals transmitted from one or a plurality of communication systems, which have a plurality of parameter sets that configure radio frames is configured, rather than according to numerology in a communication system. The phrase "rather than according to numerology in a communication system" refers to "the signal configuration being the same even for a plurality of RATS (radio communication scheme) having different numerologies". In other words, in each embodiment, the same synchronization signal configuration (radio resource domain of synchronization signal (e.g., bandwidth), sequence pattern, sub-carrier spacing, symbol length, etc.) is used in a plurality of RATs having different numerologies.

Note that in a signal communication system to which 5G RAT is applied, in the case where signals having different numerologies (different parameter sets) are used (e.g., in the case where signals having different TTI lengths transmitted upon time-division or frequency-division is applied in the same 5G RAT), synchronized signals having the same signal configuration can be used in the signals, to which the different parameter set are applied.

In particular, each of the below-described embodiments will be described using synchronization signals based on PSS/SSS, which are synchronization signals for use in LTE RAT, as synchronization signals having the same signal configuration. The synchronization signals based on PSS/SSS include synchronization signals which can be directly used while utilizing the PSS/SSS signal configuration, and synchronization signals which are used upon changing part (e.g., the sub-carrier spacing, the symbol length, etc.) of the PSS/SSS signal configuration; the former is described in the first and second embodiments, and the latter is described in the third embodiment.

Figure 3:
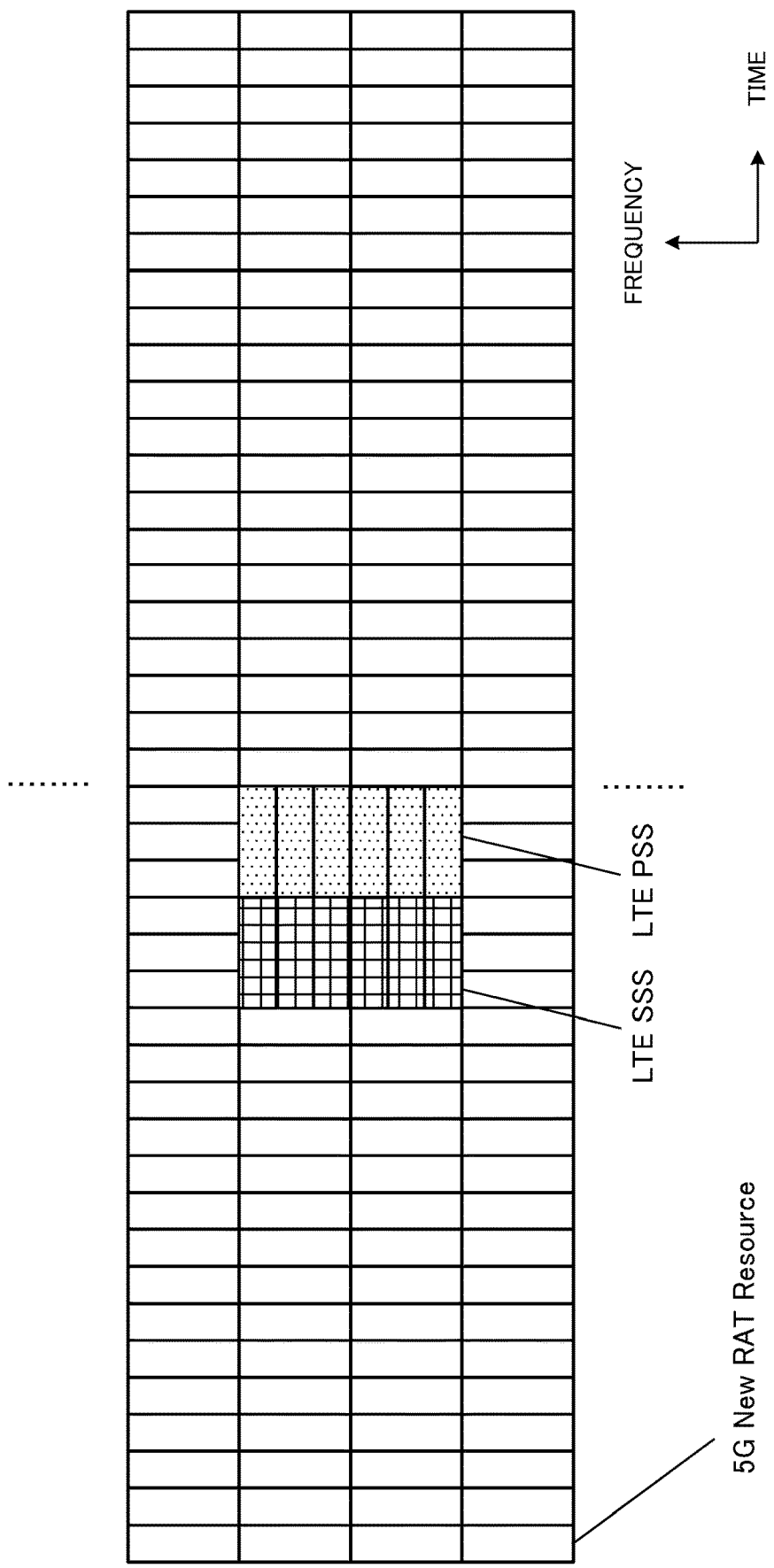
FIG. 3 is a schematic diagram showing an example of synchronization signals utilized in a radio communication system pertaining to the illustrated embodiments.

Before each embodiment is described, a general description will be given, with reference to FIG. 3, on the synchronization signals having the same signal configuration, rather than according to numerologies of communication systems. FIG. 3 is a schematic diagram showing an example of synchronization signals utilized in a radio communication system pertaining to the illustrated embodiments. Note that FIG. 3 shows a 5G RAT radio resource in a radio resource domain corresponding to 1 subframe (14 OFDM symbols× 12 sub-carriers) of LTE RAT.

FIG. 3 shows a 5G RAT radio resource configured by a numerology having a sub-carrier that is multiplied by a factor of 3 and a symbol length multiplied by a factor of ⅓ with respect to LTE RAT. In the 5G RAT resource (signal allocation unit) shown in FIG. 3, the symbol length is set to ⅓ times that of an LTE RAT resource element to which the PSS and SSS are allocated, and the sub-carrier spacing is set to 3 times those of the LTE RAT resource element to which the PSS and SSS are allocated. The signal allocation unit in 5G RAT is not limited to such a configuration, and can, for example, be allocated using a shorter time unit.

Whereas, in regard to the synchronization signals, the PSS/SSS signal configuration in LTE RAT is used without modification, rather than according to 5G RAT numerology. Namely, the synchronization signals having the same signal configuration as that of PSS/SSS in LTE RAT are scheduled. Hereinbelow, for the sake of convenience, the synchronization signals having the same signal configuration as that of PSS/SSS will be referred to as "PSS/SSS". Accordingly, a user terminal that can detect LTE RAT synchronization signals (PSS/SSS) can detect the PSS/SSS regardless of the 5G RAT numerologies. Furthermore, if a cell search is carried out on a 5G RAT cell, the user terminal first detects the PSS/SSS. Thereafter, the user terminal can control the cell search in each RAT based on the detected PSS/SSS.

First Embodiment

Figure 4:
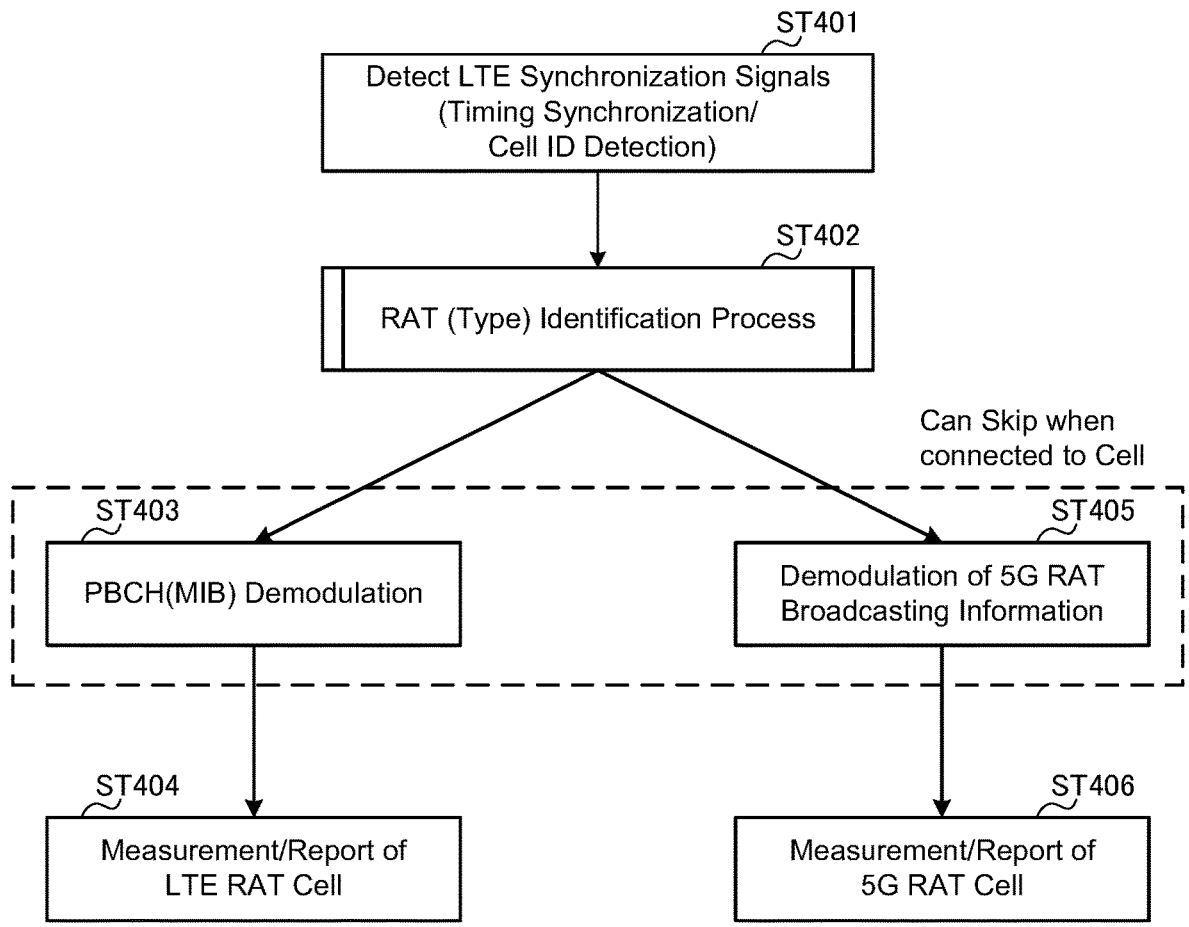
FIG. 4 is flowchart showing a cell search operation of a user terminal according to a first embodiment.

A radio communication system pertaining to the first embodiment will be herein described in which PSS/SSS of LTE RAT are used as synchronization signals for 5G RAT, rather than being based on 5G RAT numerologies. A cell search operation in a user terminal that utilizes such synchronization signals will be described hereinbelow. FIG. 4 is a flowchart showing a cell search operation of a user terminal according to the first embodiment. For example, in the case where the user terminal connects to a new cell, the following cell search operation can be carried out.

First the user terminal, in the cell search, tries to detect an LTE synchronization signal (PSS/SSS) (step ST401). Subsequently, the user terminal performs timing synchronization and cell ID detection (obtaining) based on the PSS/SSS detected at step ST401. Thereafter, the user terminal carries out a RAT (type) identification process (step ST402). In this RAT identification process, the type of RAT (LTE RAT or 5G RAT) of the connected cell is identified. Note that details of this RAT identification process will be described later.

In the case where the RAT identification process at step ST402 determines LTE RAT as the result, the user terminal carries out processes with respect to LTE RAT. Specifically, demodulation is carried out on an MIB that is transmitted on a broadcast channel (PBCH: Physical Broadcast Channel) (step ST403). Thereafter, the user terminal uses information included in the MIB to carry out a measurement and a report with respect to the LTE RAT cell (step ST404). For example, the user terminal measures the reception signal power, the reception signal quality (RSRP (Reference Signal Received Power) and RSRQ (Reference Signal Received Quality), etc.), and reports the results to a radio base station.

On the other hand, in the case where the RAT identification process at step ST402 determines 5G RAT as the result, the user terminal carries out processes with respect to 5G RAT. Specifically, demodulation is carried out on 5G RAT broadcast information (step ST405). Thereafter, the user terminal uses information on bandwidth, etc., included in 5G RAT broadcast information to carry out a measurement and a report with respect to the 5G RAT cell (step ST406).

The RAT identification process in step ST402 will be described herein. In the RAT identification process, the user terminal can identify the RAT using at least one of the following identification processes based on the received signals:

Identification Process (1-1): An Identification process based on whether or not an LTE RAT reference signal (e.g., CRS: Cell-specific Reference Signal) is present.

Identification Process (1-2): An Identification process based on whether or not a 5G RAT (per numerology) reference signal is present.

Identification Process (1-3): An Identification process based on a cell ID obtained by (both or one of) an LTE PSS/SSS.

Identification Process (1-4): An Identification process based on RAT information included in the system information.

In identification process (1-1), if an LTE RAT reference signal is detected, the user terminal identifies that the new cell is an LTE RAT cell, and advances to step ST403. Whereas, if an LTE RAT reference signal cannot be detected, the new cell is identified as a 5G RAT cell, and advances to step ST405. In identification process (1-1), since RAT can be identified based on an existing LTE RAT reference signal, RAT can be identified without requiring a special signal process.

In identification process (1-2), if a 5G RAT reference signal is detected, the user terminal identifies that the new cell is a 5G RAT cell, and advances to step ST405. Whereas, if a 5G RAT reference signal cannot be detected, the new cell is identified as an LTE RAT cell, and advances to step ST403. In identification process (1-2), since RAT can be identified based on a reference signal prescribed in LTE RAT, 5G RAT can be reliably identified.

In particular, the 5G RAT reference signal is assumed to be different for each 5G RAT numerology. Accordingly, by detecting the 5G RAT reference signal, the user terminal can distinguish different numerologies of 5G RAT. Therefore, in addition to distinguishing between an LTE RAT and a 5G RAT, the user terminal can also individually identify a plurality of 5G RATs.

In identification process (1-3), the user terminal can identify RAT in accordance to whether or not a cell ID obtained by a (LTE) PSS/SSS is a specified ID. In the case where a specified cell ID is detected, the user terminal identifies that the new cell is a 5G RAT, and advances to step ST405. Whereas, in the case where the user terminal detects an ID other than the specified ID, the new cell is identified as an LTE RAT, and advances to step ST403. In such a case, the user terminal may select a cell ID included in a local cell ID (3 alternatives) notified by the PSS to be the specified cell ID. Alternatively, a cell group ID (168 alternatives) notified by the SSS may be selected to be the specified cell ID. Furthermore, a cell ID (504 alternatives) using both PSS and SSS may be selected to be the specified cell ID.

For example, ID numbers can be allocated to a total of 504 cell ID alternatives, and if a cell ID has an ID number that is 301 or greater, this cell ID can be used for 5G RAT. Furthermore, new cell IDs can be added to the current cell IDs, and these additional cell IDs may be used as a 5G RAT cell ID. In identification process (1-3), since RAT can be identified based on a cell ID, 5G RAT of a plurality of numerologies can be flexibly identified.

In identification process (1-4), it is assumed that system information including RAT information can be obtained from an already-connected cell. In the case where system information can be obtained, the user terminal may use the RAT information included in the system information to identify that the new cell is an LTE RAT or a 5G RAT. For example, SIB can be used as system information.

In such a case, the user terminal is connected to at least one LTE RAT cell and/or 5G RAT cell. In the case where the user terminal is connected to at least one cell in such a manner, after the RAT identification process, step ST403 and step ST405 may be omitted, and advance to step ST404 or step ST406; whereby unnecessary steps can be omitted and the RAT identification process can be simplified.

Note that the above-described RAT identification process has been described regarding the case where at least one of the processes out of identification processes (1-1) through (1-4) is carried out; however, the RAT identification process is not limited thereto. For example, the user terminal can carry out a combination of a plurality of processes out of the identification processes (1-1) through (1-4). In such a case, the identification processes of the user terminal may be controlled by attaching a prioritized order to the results of the plurality of processes. Furthermore, a control may be performed so that in the case where a reference signal cannot be detected in identification process (1-1) or identification process (1-2), another identification process (e.g., identification process (1-3), etc.) is carried out.

In this manner, in the first embodiment, the user terminal can carry out a detection process on each communication system (RAT) after obtaining a timing synchronization and cell ID based on PSS/SSS (synchronization signals). Accordingly, a common synchronization signal between communication systems can be used to obtain timing synchronizations and cell IDs. Therefore, it is possible for the user terminal to obtain a timing synchronization and a cell ID regardless of the RAT (LTE RAT or 5G RAT) that is applied to each communication system. Accordingly, it is unnecessary to detect synchronization signals of different signal configurations for each communication system, thereby reducing the processing load required for cell searches. Furthermore, since signals for the cell search can be standardized, the radio communication efficiency can be improved.

In particular, in the first embodiment, a cell ID is obtained while synchronizing timing based on the PSS/SSS prescribed in LTE RAT. Accordingly, in a user terminal which can detect an LTE RAT synchronization signal (PSS/SSS), synchronization of timing can be obtained together with a cell ID. Consequently, the user terminal can synchronize LTE RAT cells and 5G RAT cells without requiring complex circuits, etc., for a synchronization process.

Furthermore, in the first embodiment, each communication system (RAT) can be identified based on at least one of: whether or not an LTE system reference signal is present, whether or not a communication system-specific reference signal is present, an identifier (e.g., a cell ID) obtained from a synchronization signal, and system information. Accordingly, since a desired method can be selected from a plurality of RAT identification methods, a communication system (RAT) can be flexibly identified in accordance with the capability, etc., of the user terminal.

Second Embodiment

Figure 5:
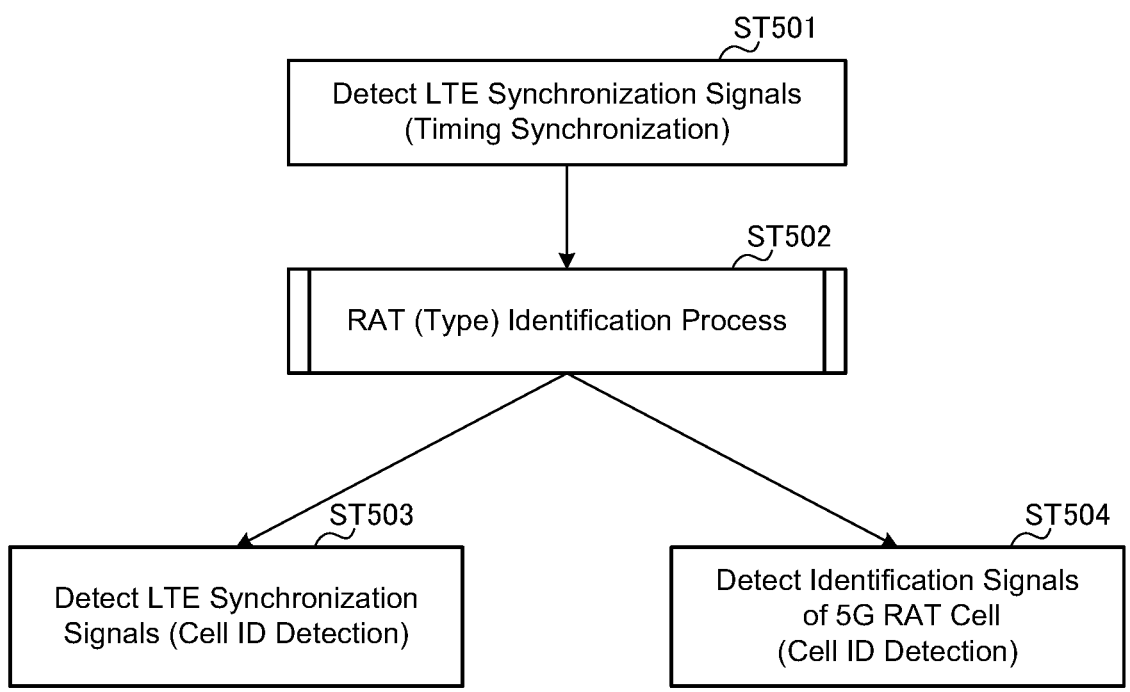
FIG. 5 is flowchart showing a cell search operation of a user terminal according to a second embodiment.

A radio communication system pertaining to the second embodiment will be herein described in which PSS/SSS of LTE RAT are used as synchronization signals for 5G RAT, rather than being based on 5G RAT numerologies, similar to the first embodiment. A cell search operation in a user terminal that utilizes such synchronization signals will be described hereinbelow. FIG. 5 is a flowchart showing a cell search operation of a user terminal according to the second embodiment. For example, in the case where the user terminal connects to a new cell, the following cell search operation can be carried out.

First the user terminal, in the cell search, tries to detect an LTE synchronization signal (PSS/SSS) (step ST501). Subsequently, the user terminal performs timing synchronization based on at least one of the PSS/SSS detected at step ST501. Thereafter, the user terminal carries out a RAT (type) identification process (step ST502). Note that details of this RAT identification process will be described later.

In the case where the result of the identification process at step ST502 determines that the new cell is an LTE RAT cell, the user terminal carries out processes with respect to LTE RAT. Specifically, the user terminal detects a cell ID in the LTE RAT (step ST503) based on the detected PSS/SSS detected at step ST501. Note that in step ST503, the cell ID may be detected in LTE RAT by detecting and using another PSS/SSS that is different from the PSS/SSS detected in step ST501.

As a result of the identification process of step ST502, if it is determined that the new cell is a 5G RAT cell, the user terminal carries out processes with respect to 5G RAT. Specifically, the user terminal detects an identification signal of the 5G RAT cell, and detects a cell ID of the 5G RAT based on the identification signal of the detected 5G RAT cell (step ST504). Note that details of this detection method of the cell ID of the 5G RAT cell will be described later.

The RAT identification process in step ST502 will be hereinbelow described. In the RAT identification process, the user terminal can identify the RAT using at least one of the following identification processes based on the received signals:

Identification Process (2-1): An Identification process based on a cell ID obtained by (both or one of) an LTE PSS/SSS.

Identification Process (2-2): An Identification process based on the relative positions between the PSS and the SSS in the LTE PSS/SSS.

Identification Process (2-3): An Identification based on the signal configuration of one of the PSS or SSS.

In identification process (2-1), the user terminal 20 carries out the same process as the identification (1-3) in the first embodiment. Hence, a detailed description thereof is omitted herein.

In identification process (2-2), the user terminal can identify, in accordance with the detected relative positions between the PSS and the SSS, whether the new cell is an LTE RAT cell or a 5G RAT cell. In the case where the user terminal identifies the new cell as an LTE RAT cell, the user terminal advances to step ST503. Whereas, in the case where the user terminal identifies the new cell as a 5G RAT cell, the user terminal advances to step ST504. If the PSS and the SSS are positioned, as relative positions between the PSS and the SSS, e.g., at positions prescribed in an existing TDD (Time Division Duplex) or FDD (Frequency Division Duplex), the user terminal may identify the new cell as an LTE RAT cell.

For example, in LTE FDD, the SSS is transmitted in a symbol immediately before the PSS. Furthermore, in LTE TDD, the SSS is transmitted three symbols before the PSS. If the PSS and the SSS are allocated in such a manner, the user terminal can determine an LTE RAT cell.

Whereas, the user terminal can identify a 5G RAT cell if the PSS and the SSS are not positioned, as relative positions between the PSS and the SSS at positions prescribed in an existing TDD or FDD. In identification process (2-2), since the RAT can be identified based on the relative positions of the PSS and the SSS, LTE RAT and 5G RAT can be identified without requiring a new signal process.

In identification process (2-3), the user terminal can identify RAT based on a signal configuration of one of PSS or SSS. For example, the user terminal may be configured to identify LTE RAT or 5G RAT based on a signal configuration of a bandwidth and a scheme pattern of PSS or SSS. In identification process (2-3), since RAT can be identified based on the signal configuration of PSS or SSS, it is possible to effectively identify LTE RAT and 5G RAT without significantly changing the existing signal configuration.

Next, a description will be given in regard to the detection method of the cell ID of the 5G RAT cell at step ST504. When a cell ID (identification signal) of a 5G RAT cell is detected, the user terminal can carry out at least one of the following identification processes:

Identification Process (3-1): An Identification process based on detected cell identification signals set for each numerology of 5G RAT.

Identification Process (3-2): An Identification process based on detected cell identification signals that are set the same in 5G RAT.

Identification Process (3-3): An Identification process based on a combination of detection results of identification process (3-1) or (3-2), and at least one of PSS and SSS used in the timing detection.

In identification process (3-1), the user terminal can detect different cell identification signals per each 5G RAT numerology. In identification process (3-1), since different cell identification signals are detected for each 5G RAT numerology, the user terminal can detect cell IDs by respectively distinguishing between a plurality of 5G RATs even in the case where a 5G RAT has a plurality of numerologies.

In identification process (3-2), the user terminal can detect the same cell identification process between different numerologies of the 5G RAT. In identification process (3-2), since the same cell identification process between numerologies of the 5G RAT is detected, the user terminal can detect a group of cell IDs of a plurality of cells compared to the case where 5G RATs are individually detected per numerology. Consequently, the process for detecting a cell ID of a 5G RAT can be simplified.

In identification process (3-3), the user terminal can detect a cell identification signal based on a detection result of at least one of a combination of a cell identification signal detected in identification process (3-1) or a cell identification signal detected in identification process (3-2) and a PSS and an SSS used in the synchronization timing in step ST501. In identification process (3-3), since a cell identification signal can be detected by combining a plurality of information, the user terminal can appropriately detect a cell ID accordance with the 5G RAT cell.

In this manner, in the second embodiment, the user terminal can synchronize timing based on PSSs/SSSs (synchronization signals). Furthermore, after carrying out a detection process on each communication system (RAT identification process), a cell ID of an LTE RAT cell or a 5G LTE RAT is obtained. Accordingly, timing synchronization can be carried out by using the same synchronization signals between each communication system.

Accordingly, the user terminal can synchronize timing regardless of the RAT (LTE RAT or 5G RAT) that is applied by each communication system. Accordingly, it is unnecessary to detect synchronization signals of different signal configurations for each communication system, thereby reducing the processing load required for cell searches. Furthermore, since signals for the cell search can be standardized, the radio communication efficiency can be improved.

In particular, in the second embodiment, synchronizing timing is obtained based on the PSSs/SSSs prescribed in LTE RAT. Accordingly, in a user terminal which can detect an LTE RAT synchronization signal (PSS/SSS), synchronization of timing can be obtained together with a cell ID. Consequently, the user terminal can synchronize LTE RAT cells and 5G RAT cells without requiring complex circuits, etc., for a synchronization process.

Furthermore, in the second embodiment, the user terminal detects a cell ID based on a cell identification signal prescribed in 5G RAT. Accordingly, since the user terminal can identify the RAT based on a cell identification signal prescribed in 5G RAT, the cell ID of the 5G RAT can be detected.

Note that the above-described embodiments (first and second embodiments) describe the case in which PSS/SSS have been used as signals having the same signal configuration, rather than according to numerology. However, in regard to using signals having the same signal configuration rather than according to numerology, such signals are not limited to PSS/SSS, and can be appropriately changed. For example, in the case where the user terminal receives PSSs, SSSs, CRSs and CSI-RSs as DRSs, the signal configuration of the PSSs/SSSs can be made the same, rather than according to numerology, and the signal configuration can be made different for the CRSs and CSI-RSs, according to numerology. Alternatively, in regard to the DRSs that are received by the user terminal, the PSSs, SSSs, CRSs and CSI-RSs may respectively use the same signal configuration, rather than according to numerology.

Third Embodiment

A radio communication system pertaining to the third embodiment will be herein described regard to the case in which, unlike in the first and second embodiments, synchronized signals (synchronized signals to which part (e.g., the sub-carrier spacing, the symbol length, etc.) of the PSS/SSS signal configuration is changed) based on PSSs/SSSs, rather than according to 5G RAT numerologies, are used as 5G RAT synchronized signals. More specifically, in the radio communication system pertaining to the third embodiment, PSSs/SSSs are used as synchronized signals in LTE RAT, whereas, synchronized signals based on PSSs/SSSs are used as synchronized signals in 5G RAT.

In the radio communication system pertaining to the third embodiment, synchronized signals based on PSSs/SSSs can be configured, e.g., by combining a transmission sequence of at least one of PSSs and SSSs with a numerology within 5G RAT. Furthermore, the same synchronization signals based on PSSs/SSSs can be used, rather than according to actual numerology in 5G RAT.

In such a case, even if the 5G RAT includes a plurality of numerologies, synchronized signals based on the same PSSs/SSSs between the plurality of numerologies can be used. Accordingly, the user terminal can identify LTE RAT synchronization signals (PSSs/SSSs) and 5G RAT synchronization signals (synchronization signals based on PSSs/SSSs). Hence, using these synchronization signals, a cell search can be carried out on both LTE cells and 5G RAT cells. Furthermore, since the same synchronization signals (synchronization signals based on PSSs/SSSs) are used as 5G RAT synchronization signals, the processing load, on the user terminal, required for the cell search on the 5G RAT can be reduced.

Furthermore, in the radio communication system pertaining to the third embodiment, the numerology of the number of sub-carriers and the sub-carrier spacing, etc., in the radio resource by which the PSSs/SSSs is transmitted, can be reused as synchronization signals based on the PSSs/SSSs. Furthermore, a 5G RAT-specific transmission sequence (a transmission sequence that is different from the PSSs/SSSs) can be transmitted to the synchronization signals based on these PSSs/SSSs.

In such a case, in the PSS/SSS configuration, since a transmission sequence that is different from that of the PSS/SSS can be used, the number of transmission sequences can be increased without significantly changing the existing configuration. Furthermore, by making the 5G RAT-specific transmission sequence orthogonal to the PSS/SSS transmission sequence, respective synchronization signals can be identified by the user terminal even if a plurality of synchronization signals are superimposed. Accordingly, the user terminal can identify an LTE RAT synchronization signal (PSS/SSS) and a 5G RAT synchronization signal (synchronization signal based on PSS/SSS). Hence, a cell search can be carried out on both an LTE RAT cell and a 5G RAT cell using these synchronization signals.

In this manner, in the third embodiment, synchronization signals based on PSSs/SSSs (synchronization signals in which part of the PSS/SSS signal configuration has been changed) are used as 5G RAT synchronization signals. Accordingly, the user terminal can identify a 5G RAT synchronization signal (synchronization signal based on PSS/SSS) and an LTE RAT synchronization signal (PSS/SSS). Hence, a cell search can be carried out on both an LTE RAT cell and a 5G RAT cell using these synchronization signals.

In particular, in the third embodiment, the same synchronization signals (synchronization signals based on PSSs/SSSs) are used as 5G RAT synchronization signals. Accordingly, in 5G RAT, there is no need to detect synchronization signals having different signal configurations, in one or a plurality of communication systems, even if a plurality of parameter sets that configure radio frames are utilized. Accordingly, the processing load, on the user terminal, required for the cell search on the 5G RAT can be reduced.

Modified Embodiments

Note that in the synchronization signals (PSSs/SSSs or synchronization signals based on PSS/SSS) of the above-described first through third embodiments, the user terminal may carry out the below-described rate-matching operation, etc.

In 5G RAT, the user terminal may perform processes while prioritizing the above-described synchronization signals. For example, a case is assumed in which, during demodulation of a shared data channel (e.g., PDSCH: Physical Downlink Shared Channel), the shared data channel radio resource superimposes the radio resource of the synchronization signals. In such a case, in regard to the radio resource of the shared data channel, the user terminal may carry out rate matching with the assumption that signals other than the synchronization signals have not been scheduled.

Furthermore, a case is envisaged in which, for example, a radio resource of not only a shared data channel, but also of a control channel (e.g., PDCCH: Physical Downlink Control Channel) or a measurement reference signal (e.g., CSI-RS: Channel State Information-Reference Signal), etc., is superimposed with the radio resource of above-described synchronization signals. Also in such a case, the user terminal may assume that signals other than the above-described synchronization signals have not been scheduled.

Note that the number of radio base stations connected to the user terminal according the each above-described embodiment is not limited to one. For example, the user terminal may be connected to a plurality of radio base stations.

In the case where a system like that shown in FIG. 1 is assumed, it is conceivable that a 5G RAT cell supports a plurality of numerologies. In such a case, by enabling the user terminal to assume that synchronization signals of such a cell are based on specified numerologies, the cell search load on the user terminal can be reduced. Consequently, the radio base station may notify the user terminal of information (may be referred to as "synchronization signal information" or "synchronization-signal configuration information", etc.) regarding a signal configuration of the synchronization signals in a predetermined cell (e.g., a 5G RAT cell) via higher layer signaling (e.g., RRC (Radio Resource Control) signaling, broadcast information, etc.).

At least one of a radio resource domain (e.g., bandwidth) of a synchronization signal, a sequence pattern, a sub-carrier spacing or a symbol length etc., may be included as synchronization-signal configuration information. Note that notification of the synchronization-signal configuration information may be carried out by a 5G RAT cell or an LTE RAT cell.

In the case where another 5G RAT cell (capacity layer, capacity carrier) is searched with respect to a user terminal that is already connected with an LTE RAT cell or 5G RAT cell (capacity layer, capacity carrier), it is possible that the numerology that is used might be different depending on the usage of this other 5G RAT cell. In such a case, by notifying the user terminal of the synchronization-signal configuration information via higher layer signaling, an appropriate synchronization signal can be applied without increasing the load on the user terminal.

(Configuration of Radio Communication System)

The following description concerns the configuration of a radio communication system according to an embodiment of the present invention. In this radio communication system, a radio communication method is adopted to which the above-described embodiments of the present invention are applied. Furthermore, the radio communication methods of the above-described embodiments can be applied independently, or in combination.

Figure 6:
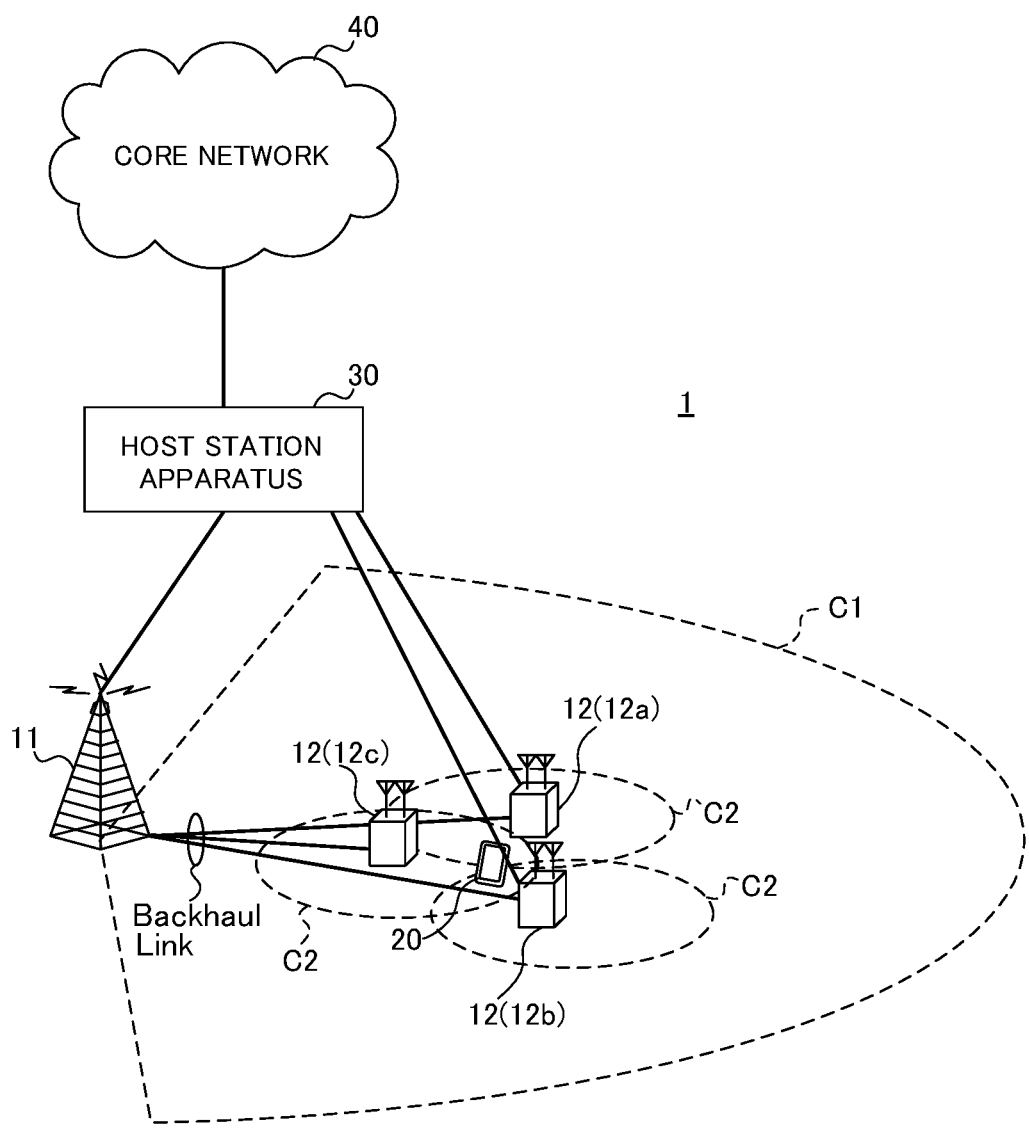
FIG. 6 is an illustrative diagram of a schematic configuration of a radio communication system of according to an illustrated embodiment of the present invention.
Figure 10:
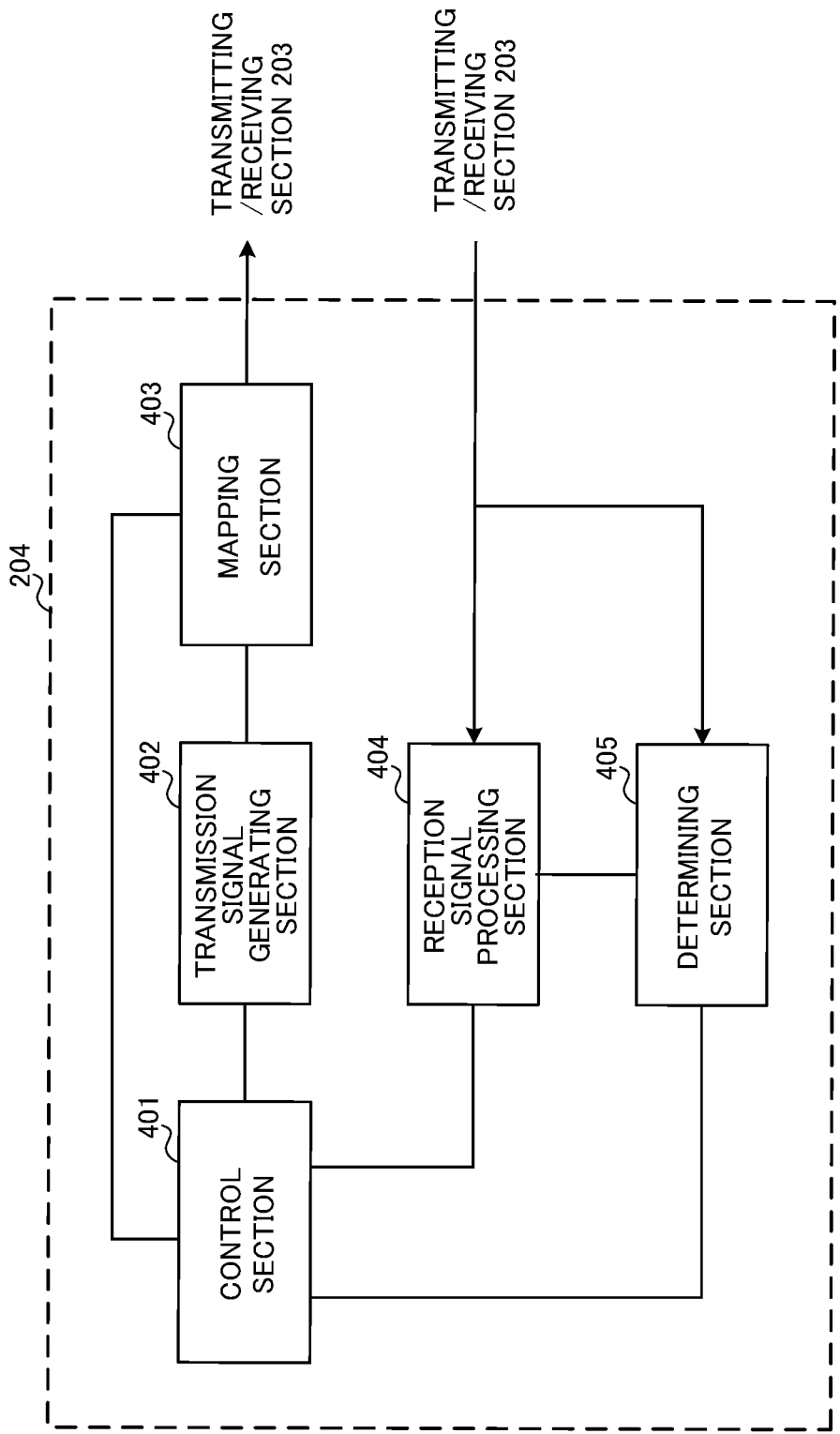
FIG. 10 is an illustrative diagram showing a functional configuration of the user terminal according to the illustrated embodiment of the present invention.

FIG. 6 shows an example of a schematic configuration of the radio communication system according to an embodiment of the present invention. The radio communication system shown in FIG. 10 is, for example, a system that includes an LTE system, SUPER 3G and LTE-A connectivity (DC), which are an integration of a plurality of component carriers (CCs), can be applied to this radio communication system. Furthermore, the plurality of CCs may include licensed band CCs which use a licensed band and unlicensed band CCs which use an unlicensed band. Note that this radio communication system may also be called IMT-Advanced, 4G ($4^{th}$ Generation Mobile Communication System), 5G ($5^{th}$ Generation Mobile Communication System), or FRA (Future Radio Access), etc.

The radio communication system 1 shown in FIG. 6 includes a radio base station 11 which forms a macro cell C1, and a radio base station 12 (12a through 12c) provided within the macro cell C1 and forms a small cell C2 that is smaller than the macro cell C1. Furthermore, a user terminal 20 is provided within the macro cell C1 and the small cell C2.

The user terminal 20 can connect both to the radio base station 11 and the radio base station 12. It is assumed that the user terminal 20 concurrently uses the macro cell C1 and the small cell C2 that uses different frequencies via CA or DC. Furthermore, the user terminal can apply CA using at least two CCs (cells), and can utilize six or more CCs.

Furthermore, numerology that is used in LTE Rel. 12 can be applied to UL transmission and/or DL transmission between the user terminal 20 and the radio base station 11/radio base station 12. Furthermore, in the radio base station 12, in addition to numerologies used in LTE Rel. 12, 5G RAT numerologies used in 5G can be applied when carrying out UL transmission and/or DL transmission.

Communication between the user terminal 20 and the radio base station 11 can be carried out using a carrier (called an "existing carrier", "Legacy carrier", etc.) having a narrow bandwidth in a relatively low frequency band (e.g., 2 GHz). Whereas, communication between the user terminal 20 and the radio base station 12 may be carried out using a carrier having a wide bandwidth in a relative high frequency band (e.g., 3.5 GHz, 5 GHz, etc.), or using the same carrier as that with the radio base station 11. A fixed-line connection (e.g., optical fiber, or X2 interface, etc.) or a wireless connection can be configured between the radio base station 11 and the radio base station 12 (or between two radio base stations 12).

The radio base station 11 and each radio base station 12 are connected to a host station apparatus 30, and are connected to the core network 40 via the host station apparatus 30. The host station apparatus 30 includes, but is not limited to, an access gateway apparatus, a radio network controller (RNC), and a mobility management entity (MME), etc. Furthermore, each radio base station 12 may be connected to the host station apparatus 30 via the radio base station 11.

Note that the radio base station 11 is a radio base station having a relatively wide coverage, and may be called a macro base station, an aggregation node, eNB (eNodeB) or a transmission/reception point. Furthermore, the radio base station 12 is a radio base station having local coverage, and may be called a small base station, a micro base station, a pico base station, a femto base station, HeNB (Home eNodeB), RRH (Remote Radio Head), or a transmission/reception point, etc. Hereinafter, the radio base stations 11 and 12 will be generally referred to as "a radio base station 10" in the case where they are not distinguished.

Each user terminal 20 is compatible with each kind of communication scheme such as LTE, LTE-A, 5G, etc., and also includes a mobile communication terminal and a fixed communication terminal.

In the radio communication system 1, OFDMA (Orthogonal Frequency Division Multiple Access) is applied to the downlink and SC-FDMA (Single-Carrier Frequency Division Multiple Access) is applied to the uplink as radio access schemes. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system bandwidth into bands formed with one or continuous resource blocks, and allowing a plurality of terminals to use mutually different bands. Note that the uplink and downlink radio access schemes are not limited to the above combinations; for example, OFDMA may be used in the uplink.

In the radio communication system 1, a downlink shared channel (PDSCH: Physical Downlink Shared Channel) that is shared by each user terminal 20, a broadcast channel (PBCH: Physical Broadcast channel), and an L1/L2 control channel, etc., are used as downlink channels. User data and higher layer control information, and a predetermined SIB (System Information Block) are transmitted on the PDSCH. Furthermore, an MIB (Master Information Block), etc., is transmitted on the PBCH.

Furthermore, in the radio communication system 1, a numerology configured with different parameters to the numerology used in LTE RAT may be applied as 5G RAT. In 5G RAT numerology, large resource elements that are different for each numerology are prescribed, and radio resources are scheduled using different units. Furthermore, a plurality of different numerologies may be used in 5G RAT.

The downlink L1/L2 control channel includes a PDCCH (Physical Downlink Control Channel), an EPDCCH (Enhanced Physical Downlink Control Channel), a PCFICH (Physical Control Format Indicator Channel), and a PHICH (Physical Hybrid-ARQ Indicator Channel), etc. Downlink control information (DCI), etc., which includes PDSCH and PUSCH scheduling information, is transmitted by the PDCCH. The number of OFDM symbols used in the PDCCH is transmitted by the PCFICH. A HARQ delivery acknowledgement signal (ACK/NACK) for the PUSCH is transmitted by the PHICH. An EPDCCH that is frequencydivision-multiplexed with a PDSCH (downlink shared data channel) can be used for transmitting the DCI in the same as the PDCCH.

Furthermore, a downlink reference signal includes a cell-specific reference signal (CRS), a channel state information reference signal (CRS-RS), and a demodulation reference signal (DM-RS), etc.

In the radio communication system 1, an uplink shared channel (PUSCH: Physical Uplink Shared Channel) that is shared by each user terminal 20, an uplink control channel (PUCCH: Physical Uplink Control Channel), and a random access channel (PRACH: Physical Random Access Channel), etc., are used as uplink channels. The PUSCH is used to transmit user data and higher layer control information. Furthermore, the PUCCH is used to transmit downlink radio quality information (CQI: Channel Quality Indicator), and delivery acknowledgement signals (HARQ-ACK). A random access preamble (RA preamble) for establishing a connection with a cell is transmitted by the PRACH.

<Radio Base Station>

Figure 7:
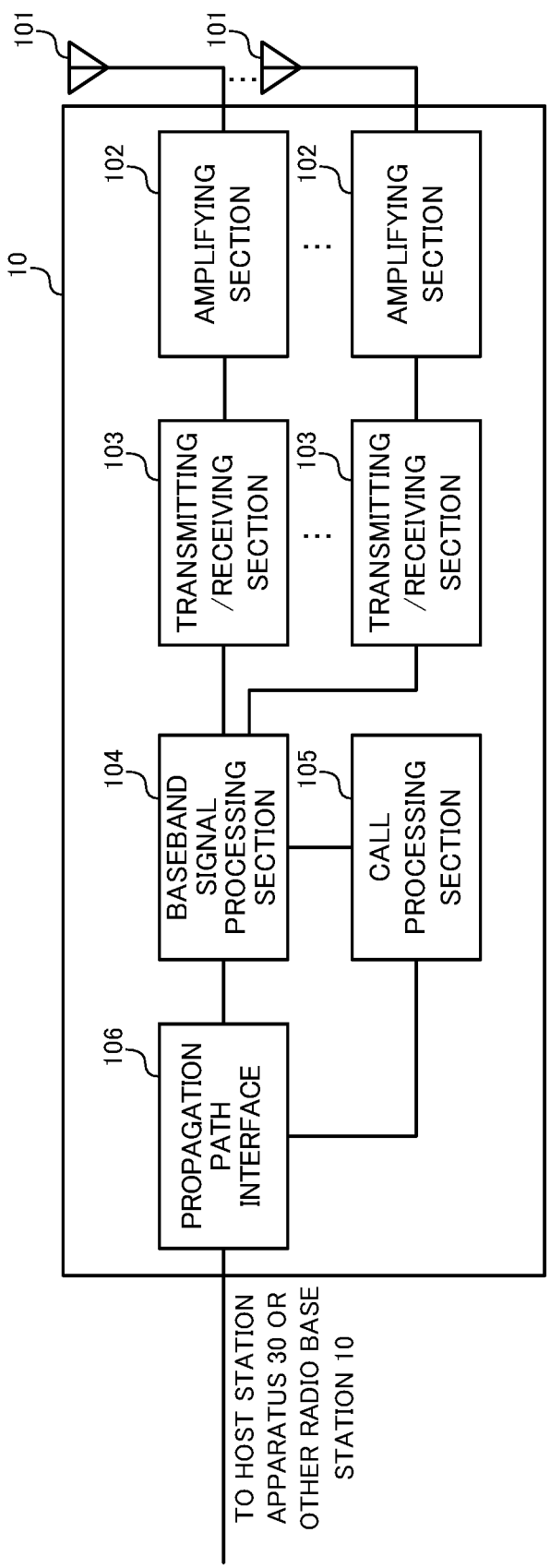
FIG. 7 is an illustrative diagram showing an overall configuration of a radio base station according to the illustrated embodiment of the present invention.

FIG. 7 is a diagram illustrating an overall configuration of the radio base station according to the embodiment of the present invention. The radio base station 10 is configured of a plurality of transmission/reception antennas 101, amplifying sections 102, transmitting/receiving sections 103, a baseband signal processing section 104, a call processing section 105 and a transmission path interface 106. Furthermore, each transmitting/receiving section 103 may be configured as an integral transmitting/receiving section, or configured as a transmitting section and a receiving section.

User data that is to be transmitted on the downlink from the radio base station 10 to the user terminal 20 is input from the host station apparatus 30, via the transmission path interface 106, into the baseband signal processing section 104.

In the baseband signal processing section 104, in regard to the user data, signals are subjected to PDCP (Packet Data Convergence Protocol) layer processing, RLC (Radio Link Control) layer transmission processing such as division and coupling of user data and RLC retransmission control transmission processing, MAC (Medium Access Control) retransmission control (e.g., HARQ (Hybrid Automatic Repeat reQuest) transmission processing), scheduling, transport format selection, channel coding, inverse fast Fourier transform (IFFT) processing, and precoding processing, and resultant signals are transferred to the transmission/reception sections 103. Furthermore, in regard to downlink control signals, transmission processing is performed, including channel coding and inverse fast Fourier transform, and resultant signals are also transferred to the transmission/reception sections 103.

Each transmitting/receiving section 103 converts the baseband signals, output from the baseband signal processing section 104 after being precoded per each antenna, to a radio frequency band and transmits this radio frequency band. The radio frequency signals that are subject to frequency conversion by the transmitting/receiving sections 103 are amplified by the amplifying sections 102, and are transmitted from the transmission/reception antennas 101.

Furthermore, each transmitting/receiving section (transmitting section) 103 can transmit an LTE PSS and/or SSS (hereinafter referred to as simply PSS/SSS), which are LTE synchronization signals, to the user terminal 20 or another radio base station 10. Furthermore, each transmitting/receiving section (transmitting section) 103 can transmit 5G RAT synchronization signals adapted to 5G RAT numerology to the user terminal 20 or another radio base station 10.

Furthermore, each transmitting/receiving section (transmitting section) 103 can transmit a 5G RAT reference signal newly defined in 5G RAT, a 5G RAT broadcast signal, and a 5G RAT cell identification signal, etc.

Furthermore, each transmitting/receiving section (transmitting section) 103 may transmit information (may be referred to as "synchronization signal information" or "synchronization-signal configuration information", etc.) regarding a signal configuration of synchronization signals in a predetermined cell (e.g., a 5G RAT cell). Information in regard to at least one of a radio resource domain (e.g., bandwidth) of a synchronization signal, a sequence pattern, a sub-carrier spacing or a symbol length etc., may be included as synchronization-signal configuration information.

Whereas, in regard to the uplink signals, radio frequency signals received by each transmission/reception antenna 101 are amplified by each amplifying section 102. The transmitting/receiving sections 103 receive the uplink signals that are amplified by the amplifying sections 102, respectively. The transmitting/receiving sections 103 frequency-convert the received signals into baseband signals and the converted signals are then output to the baseband signal processing section 104.

Based on common recognition in the field of the art pertaining to the present invention, each transmitting/receiving section 103 can correspond to a transmitter/receiver, a transmitter/receiver circuit or a transmitter/receiver device.

The baseband signal processing section 104 performs FFT (Fast Fourier Transform) processing, IDFT (Inverse Discrete Fourier Transform) processing, error correction decoding, MAC retransmission control reception processing, and RLC layer and PDCP layer reception processing on user data included in the input uplink signals. The signals are then transferred to the host station apparatus 30 via the transmission path interface 106. The call processing section 105 performs call processing such as setting up and releasing a communication channel, manages the state of the radio base station 10, and manages the radio resources.

The transmission path interface 106 performs transmission and reception of signals with the host station apparatus 30 via a predetermined interface. Furthermore, the transmission path interface 106 can perform transmission and reception of signals (backhaul signaling) with a neighboring radio base station 10 via an inter-base-station interface (for example, optical fiber based on CPRI (Common Public Radio Interface), X2 interface).

Figure 8:
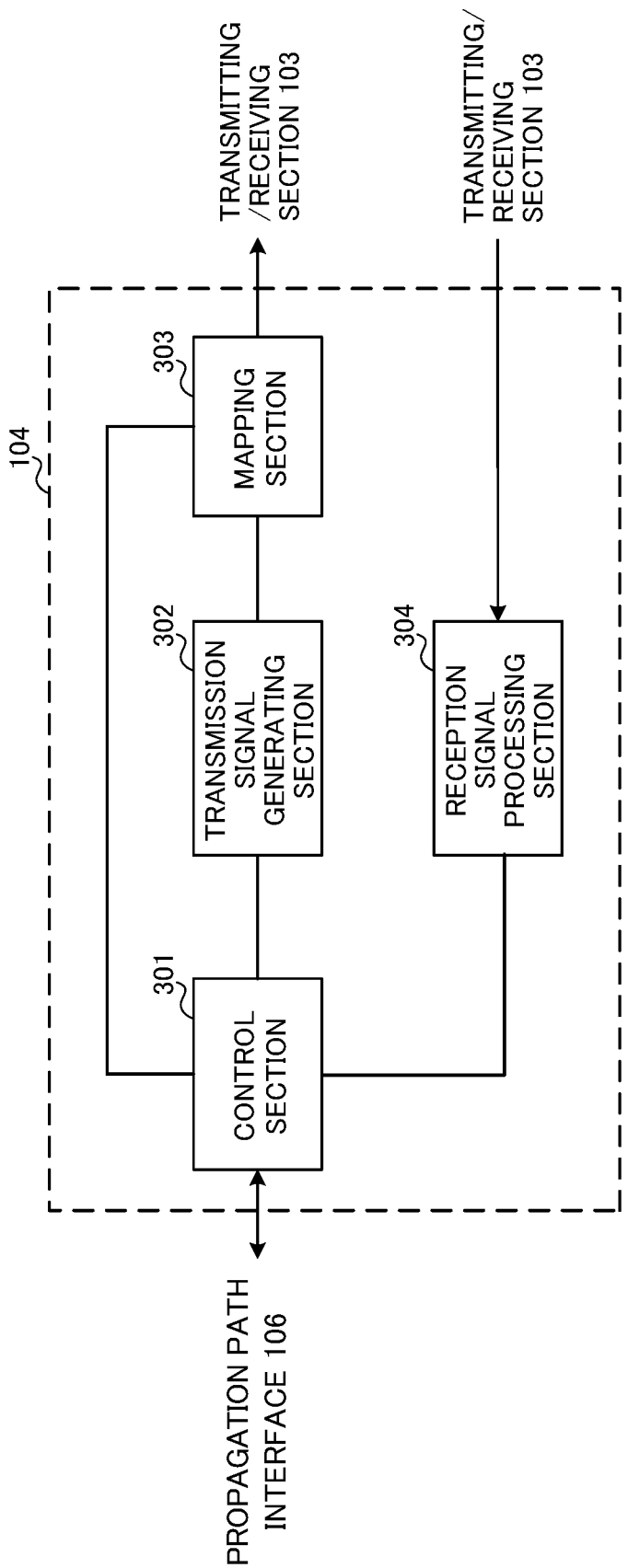
FIG. 8 is an illustrative diagram of a functional configuration of the radio base station according to the illustrated embodiment of the present invention.

FIG. 8 is a diagram illustrating the functional configurations of the radio base station according to the present embodiment. Note that although FIG. 8 mainly shows functional blocks of the features of the present embodiment, the radio base station 10 is also provided with other functional blocks that are necessary for carrying out radio communication. As illustrated in FIG. 8, the baseband signal processing section 104 includes a control section (scheduler) 301, a transmission signal generating section (generating section) 302, a mapping section 303 and a reception signal processing section 304.

The control section (scheduler) 301 controls scheduling (e.g., resource allocation) of downlink data signals to be transmitted on a PDSCH, and downlink control signals to be transmitted on either or both of PDCCH and enhanced PDCCH (EPDCCH). Furthermore, the control section 301 also controls the scheduling of system information, synchronization signals, paging information, CRS, and CSI-RS (Channel State Information Reference Signal), etc. Furthermore, the control section 301 controls the scheduling of an uplink reference signal, an uplink data signal transmitted by a PUSCH, and an uplink control signal, etc., that is transmitted by a PUCCH and/or a PUSCH.

The control section 301 controls the scheduling of the LTE PSSs/SSSs that are transmitted as synchronization signals. Furthermore, the control section 301 may perform a control to transmit information by which the user terminal 20 can identify a RAT in accordance with whether an LTE RAT cell is applied or a 5G RAT cell is applied.

For example, the user terminal may identify a RAT by the control section 301 controlling whether or not to transmit an LTE RAT reference signal. Furthermore, the user terminal may identify a RAT by the control section 301 controlling whether or not to transmit a 5G RAT reference signal. Furthermore, the user terminal may identify a RAT by the control section 301 controlling whether or not to transmit a specified ID of an LTE PSS/SSS. Furthermore, the control section 301 may perform a control to include information that can identify a RAT in system information (e.g., SIB) that is broadcast to the user terminal.

Furthermore, the control section 301 may control information included in a transmitted LTE PSS/SSS, and information for the user terminal to identify a RAT may be included in the LTE PSS/SSS. For example, the user terminal may identify a RAT by the control section 301 performing a control so that an ID obtained from at least one LTE PSS/SSS is used as a specified ID. Furthermore, the user terminal may identify a RAT by the control section 301 controlling relative positions of PSSs and SSSs of LTE PSSs/SSSs. Furthermore, the user terminal may identify a RAT by the control section 301 controlling the signal configuration of either the PSS or the SSS of each LTE PSS/SSS.

Furthermore, the control section 301 may perform a control so that the transmitted synchronization signals are based on the LTE PSSs/SSSs. For example, the control section 301 may perform a control to configure a transmission sequence of transmitted synchronization signals (PSSs or SSSs) together with one numerology of 5G RAT, and determine a common synchronization signal with respect to 5G RAT having different numerologies.

Furthermore, the control section 301 may perform a control to reuse the numerology of the number of sub-carriers and the sub-carrier spacing, etc., used by an LTE PSS/SSS, and transmit a 5G RAT sequence by a resource in which the LTE PSS/SSS is allocated. Note Based on common recognition in the field of the art pertaining to the present invention, the control section 301 can be configured as a controller, a control circuit or a control device.

Furthermore, the control section 301 may perform a control to notify the user terminal 20 of synchronization-signal configuration information regarding a predetermined cell (e.g., a 5G RAT cell) via higher layer signaling. The control section 301 may perform a control to transmit synchronization signal information in at least one cell of cells (e.g., 5G RAT cells and LTE RAT cells) that are formed by the radio base station 10.

The transmission signal generating section 302 generates DL signals based on instructions from the control section 301, and outputs the generated signals to the mapping section 303. For example, the transmission signal generating section 302 generates, based on instructions from the control section 301, a DL assignment that notifies downlink signal allocation information, and a UL grant that notifies uplink signal allocation information.

Furthermore, the transmission signal generating section 302 can generate LTE PSSs/SSSs and synchronization signals based on LTE PSSs/SSSs based on instructions from the control section 301. Note that based on common recognition in the field of the art pertaining to the present invention, the downlink control signal generating section 302 can be configured as a signal generator or a signal generating circuit. Furthermore, the transmission signal generating section 302 can be configured as a signal generating section according to the present invention.

Based on instructions from the control section 301, the mapping section 303 maps the downlink signal generated in the transmission signal generating section 302 to predetermined radio resources to output to the transmitting/receiving sections 103. Based on common recognition in the field of the art pertaining to the present invention, the mapping section 303 can correspond to a mapping circuit and a mapper.

The reception signal processing section 304 performs a receiving process (e.g., demapping, demodulation, and decoding, etc.) on UL signals (e.g., an HARQ-ACK, PUCCH, PUCCH, etc.) transmitted from the user terminal 20. The result of this process is output to the control section 301. Furthermore, the reception signal processing section 304 may carry out channel estimation.

Based on common recognition in the field of the art pertaining to the present invention, the reception signal processing section 304 can be configured as a signal processor, a signal processing circuit, or a signal processing device; or can be configured as a measurer, a measuring circuit or a measuring device.

<User Terminal>

Figure 9:
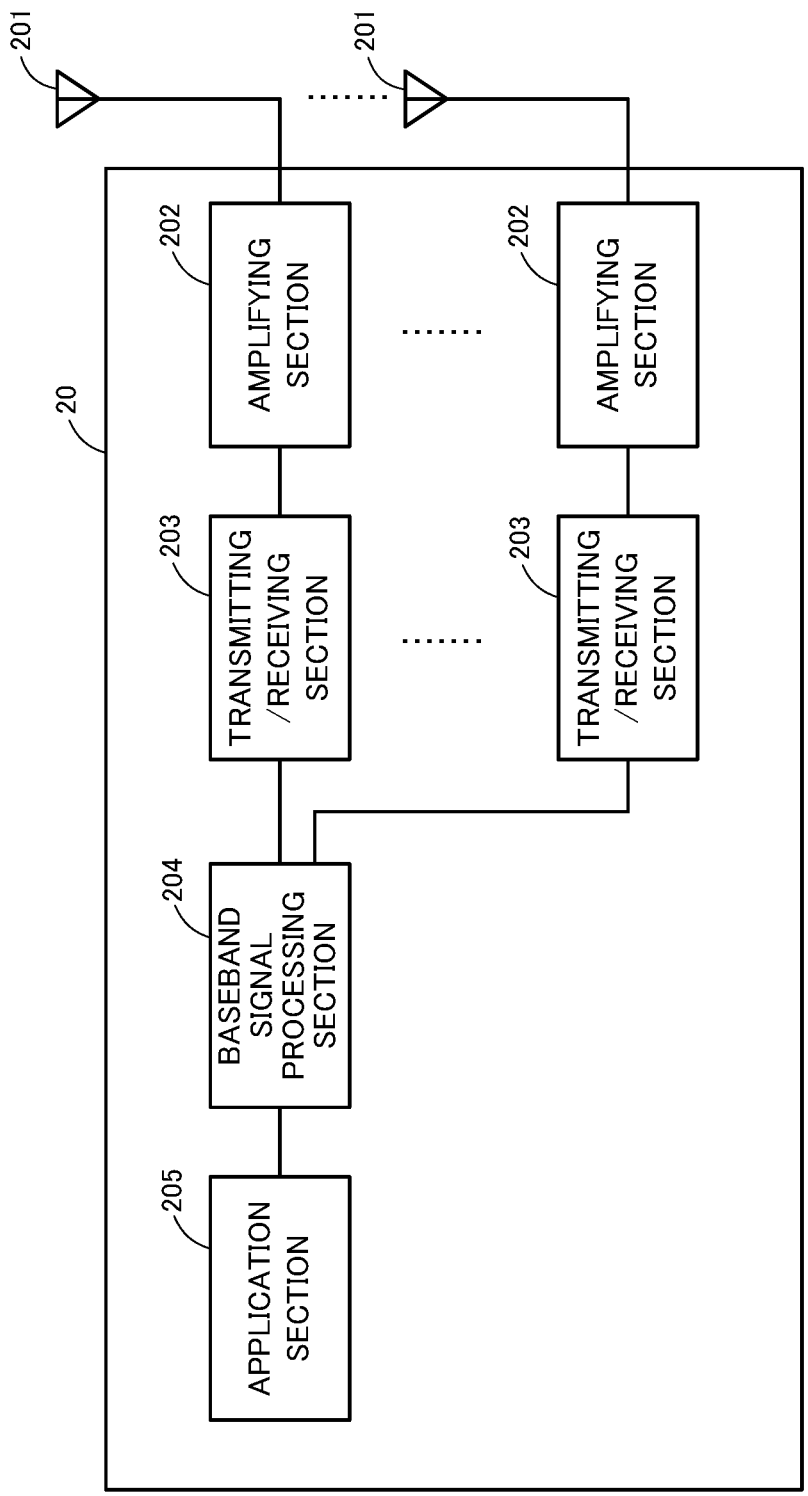
FIG. 9 is an illustrative diagram showing an overall configuration of a user terminal according to the illustrated embodiment of the present invention.

FIG. 9 is a diagram showing an overall structure of a user terminal according to the present embodiment. The user terminal 20 is provided with a plurality of transmitting/receiving antennas 201 for MIMO communication, amplifying sections 202, transmitting/receiving sections 203, a baseband signal processing section 204 and an application section 205. Note that each transmitting/receiving section 203 may be configured of an integral transmitting/receiving section, or be configured of a transmitting section and a receiving section.

Radio frequency signals that are received in the plurality of transmitting/receiving antennas 201 are respectively amplified in the amplifying sections 202. Each transmitting/receiving section 203 receives a downlink signal that has been amplified by an associated amplifying section 202. The transmitting/receiving sections 203 perform frequency conversion on the reception signals to convert into baseband signals, and are thereafter output to the baseband signal processing section 204.

Each transmitting/receiving section (receiving section) 203 receives a DL data signal (e.g., PDSCH) and a DL control signal (e.g., an HARQ-ACK, DL assignment, UL grant, etc.). Furthermore, each transmitting/receiving section (receiving section) 203 receives synchronization signals transmitted from the radio base station 10. Each transmitting/receiving section (receiving section) 203 can receive predetermined synchronization signals rather than depending on numerology used in radio communication. For example, the transmitting/receiving sections 203 can receive predetermined synchronization signals rather than depending on numerology used in radio communication. For example, each transmitting/receiving section 203 can receive synchronization signals used in LTE, such as LTE PSSs/SSSs, etc., and synchronization signals according to numerology that is used in 5G RAT.

Furthermore, each transmitting/receiving section (receiving section) 203 may receive from the radio base station 10 synchronization-signal configuration information in regard to a predetermined cell (e.g., a 5G RAT cell).

Furthermore, each transmitting/receiving section (receiving section) 203 can report measurement results such as channel state information (CSI), etc., to the radio base station 10. Note that based on common recognition in the field of the art pertaining to the present invention, each transmitting/receiving section 203 can be configured as a transmitter/receiver, a transmitting/receiving circuit, or a transmitting/receiving device.

The input baseband signal is subjected to an FFT process, error correction decoding, a retransmission control receiving process, etc., in the baseband signal processing section 204. The downlink user data is forwarded to the application section 205. The application section 205 performs processes related to higher layers above the physical layer and the MAC layer. Furthermore, out of the downlink data, broadcast information is also forwarded to the application section 205.

On the other hand, uplink user data is input to the baseband signal processing section 204 from the application section 205. In the baseband signal processing section 204, a retransmission control transmission process (e.g., a HARQ transmission process), channel coding, precoding, a discrete fourier transform (DFT) process, an inverse fast fourier transform (IFFT) process, etc., are performed, and the result is forwarded to each transmitting/receiving section 203. The baseband signal that is output from the baseband signal processing section 204 is converted into a radio frequency band in the transmitting/receiving sections 203. Thereafter, the amplifying sections 202 amplify the radio frequency signal having been subjected to frequency conversion, and transmit the resulting signal from the transmitting/receiving antennas 201.

FIG. 10 is a diagram illustrating the functional configurations of the user terminal according to the present embodiment. Note that FIG. 10 mainly shows functional blocks of the features of the present embodiment; the user terminal 20 is also provided with other functional blocks that are necessary for carrying out radio communication. As illustrated in FIG. 10, the baseband signal processing section 204 provided in the user terminal 20 includes a control section 401, a transmission signal generating section 402, a mapping section 403, a reception signal processing section 404, and a determining section 405.

The control section 401 can control the transmission signal generating section 402, the mapping section 403, the reception signal processing section 404 and the determining section 405. For example, the control section 401 obtains the downlink control signals (signals transmitted on a PDCCH/EPDCCH) and the downlink data signals (signals transmitted on a PDSCH), which were transmitted from the radio base station 10, from the reception signal processing section 404. The control section 401 controls the generation/transmission of the uplink control signals (e.g., delivery acknowledgement signals (HARQ-ACK), etc.) and the uplink data signals based on the determination result of whether or not a retransmission control is necessary for the downlink control signals (UL grant) and the downlink data signals.

Furthermore, when synchronized with the radio base station 10, the control section 401 can control the cell search operations described in the above embodiments. The control section 401 controls the cell search based on the synchronized signals received by the transmitting/receiving sections 203. Furthermore, the control section 401 determines the RAT type that is used in the radio communication system based on a determination result of the determining section 405. Furthermore, the control section 401 can control the transmission and reception in the transmitting/receiving sections 203 using a different numerology to the numerology received in the synchronization signals. In other words, the control section 401 can control the transmission and reception of signals that use a plurality of numerologies.

Furthermore, if a connection with an LTE RAT cell is determined as result of the RAT type identification process, the control section 401 can perform a control to report/measure the LTE RAT cell based on an MIB demodulation result received by a PBCH. Furthermore, if a connection with a 5G RAT cell is determined as result of the RAT type identification process, the control section 401 can perform a control to report/measure the 5G RAT cell based on a demodulation result of 5G RAT broadcast information.

Furthermore, if a connection with a 5G RAT cell is determined as result of the RAT type identification process, the control section 401 can detect the below-indicated signals and carry out a cell ID detection: (1) identification (cell ID) signals that are different for each 5G RAT numerology, (2) common cell identification signals for different 5G RAT numerologies, and (3) a combination of the signals indicated in (1) or (2) and at least one detection result signal of a PSS or an SSS.

Furthermore, if communication is carried out with a 5G RAT cell and if a shared data channel in 5G RAT is superimposed with a radio resource of an LTE synchronization signal, the control section 401 may assume that there is no data in the shared data channel and carry out rate matching. Accordingly, the user terminal 20 can preferentially receive LTE synchronization signals.

Furthermore, if communication is carried out with a 5G RAT cell, and if a control channel and a measurement reference signal, etc., in 5G RAT is superimposed with a radio resource of an LTE synchronization signal, the control section 401 may assume that there is no data in the shared data channel. Accordingly, the user terminal 20 can preferentially receive LTE synchronization signals.

Furthermore, the control section 401 can perform a control to measure the reception signal power and reception signal quality (RSRP (Reference Signal Received Power) and RSRQ (Reference Signal Received Quality), etc.) and report the results thereof to the radio base station 10. Based on common recognition in the field of the art pertaining to the present invention, the control section 401 can be configured as a controller, a control circuit or a control device.

Note that the control section 401 may perform a control to specify a synchronization signal configuration of a predetermined cell based on synchronization-signal configuration information regarding the predetermined cell that is input from the reception signal processing section 404, and implement a cell search in regard to the predetermined cell.

The transmission signal generating section 402 generates UL signals based on instructions from the control section 401, and outputs these UL signals to the mapping section 403. For example, the transmission signal generating section 402 generates uplink control signals, such as a delivery acknowledgement signal (HARQ-ACK) and channel state information (CSI), etc., based on instructions from the control section 401.

Furthermore, the transmission signal generating section 402 generates uplink data signals based on instructions from the control section 401. For example, in the case where a UL grant is included in the downlink control signal that is notified from the radio base station 10, the control section 401 instructs the transmission signal generating section 402 to generate an uplink data signal. Based on common recognition in the field of the art pertaining to the present invention, the transmission signal generating section 402 can correspond to a signal generator, a signal generating circuit, or a signal generating device.

The mapping section 403 maps the uplink signal (uplink control signal and/or uplink data) generated by the transmission signal generating section 402, based on instructions from the control section 401, to radio resources and outputs the generated signal to the transmitting/receiving sections 203. Based on common recognition in the field of the art pertaining to the present invention, the mapping section 403 can correspond to a mapper, a mapping circuit or a mapping device.

The reception signal processing section 404 performs reception processing (e.g., demapping, demodulation, decoding, etc.) on the DL signals (e.g., a downlink control signal transmitted from the radio base station on a PDCCH/EPDCCH, downlink data signals transmitted on the PDSCH, etc.). The reception signal processing section 404 outputs the information received from the radio base station 10 to the control section 401 and the determining section 405. Based on common recognition in the field of the art pertaining to the present invention, the reception signal processing section 404 can correspond to a signal processor, a signal processing circuit, or a signal processing device. Furthermore, the reception signal processing section 404 can be configured as a receiving section pertaining to the present invention.

Furthermore, the control section 401 uses the synchronization signals transmitted by the radio base station 10 to carry out a RAT identification (determining) process. After carrying out timing (and frequency) synchronization and cell ID (identification) detection on the received synchronization signals, the determining section 405 may carry out a RAT identification process that identifies whether the connected cell is an LTE RAT cell or a 5G RAT cell. In such a case, the determining section 405 may identify a RAT in accordance to whether or not an LTE reference signal is present, wherein or not a 5G RAT reference signal is present, or whether or not a specified cell ID has been received.

Furthermore, after carrying out timing (and frequency) synchronization using the received synchronization signals, the determining section 405 may carry out a RAT identification process. In such a case, the determining section 405 may identify a RAT in accordance to whether or not a cell ID having a cell of at least one of a PSS and an SSS is received, the relative positions of the PSS and the SSS, and the signal configuration of the PSS or the SSS.

Based on common recognition in the field of the art pertaining to the present invention, the determining section 405 can be configured as a measurer, a measuring circuit, or a measuring device. Furthermore, the determining section 405 may function together with the control section 401.

Furthermore, the block diagrams used in the above description of the present embodiment indicate function-based blocks. These functional blocks (configured sections) are implemented via a combination of hardware and software. Furthermore, the implementation of each functional block is not limited to a particular means. In other words, each functional block may be implemented by a single device that is physically connected, or implemented by two or more separate devices connected by a fixed line or wirelessly connected.

For example, some or all of the functions of the radio base station 10 and the user terminal 20 may be implemented by using hardware such as ASICs (Application Specific Integrated Circuits), PLDs (Programmable Logic Devices) and FPGAs (Field Programmable Gate Arrays), etc. Furthermore, the radio base station 10 and the user terminal 20 may be each implemented by a computer device that includes a processor (CPU: Central Processing Unit), a communication interface for connecting to a network, a memory and a computer-readable storage medium that stores a program(s). In other words, the radio communication system and the user terminal, etc., pertaining to the embodiment of the present invention may function as a computer that performs processes of the radio communication method pertaining to the present invention.

The processor and memory, etc., are connected to buses for communication of information. Furthermore, the computer-readable storage medium includes, e.g., a flexible disk, a magnetic-optical disk, ROM (Read Only Memory), EPROM (Erasable Programmable ROM), CD-ROM (Compact Disc-ROM), RAM (Random Access Memory), or a hard disk, etc. Furthermore, a program may be transmitted from a network via electric telecommunication lines. Furthermore, the radio base station 10 and the user terminal 20 may also include an input device such as input keys, and an output device such as a display.

The functional configurations of the radio base station 10 and the user terminal 20 may be implemented using the above-mentioned hardware, may be implemented using software modules that are run by a processor, or may be implemented using a combination of both thereof. The processor controls the entire user terminal by operating an operating system. Furthermore, the processor reads programs, software modules and data from the storage medium into a memory, and performs the various processes thereof accordingly.

The above-mentioned program only needs to be a program that can perform the operations described in the above embodiment on a computer. For example, the control section 401 of the user terminal 20 may be stored in the memory, and implemented by the processor operating a control program, and the other above-mentioned functional blocks can also be implemented in the same manner.

Furthermore, software and commands, etc., may be transmitted/received via a transmission medium. For example, in the case where software is transmitted from a website, server or other remote source by using fixed-line technology, such as coaxial cable, optical fiber cable, twisted-pair wire and digital subscriber's line (DSL), etc., and/or wireless technology, such as infrared, radio and microwaves, etc., such fixed-line technology and wireless technology are included within the definition of a transmission medium.

Note that technical terms discussed in the present specification and/or technical terms necessary for understanding the present specification may be replaced with technical terms having the same or similar meaning. For example channel and/or symbol may be signals (signaling). Furthermore, a signal may be a message. Furthermore, component carrier (CC) may be called a carrier frequency or cell, etc.

Furthermore, information and parameters, etc., discussed in the present specification may be expressed as absolute values, or as a relative value with respect to a predetermined value, or expressed as other corresponding information. For example, a radio resource may be indicated as an index.

Information and signals, etc., discussed in the present specification may be expressed using any one of various different technologies. For example, data, instructions, commands, information, signals, bits, symbols, chips, etc., that could be referred to throughout the above description may be expressed as voltage, current, electromagnetic waves, a magnetic field or magnetic particles, optical field or photons, or a desired combination thereof.

The above-described aspects/embodiments of the present invention may be used independently, used in combination, or may be used by switching therebetween when predetermined information (e.g., notification of "is X") does not need to be explicit, but may be implicitly (e.g., by not notifying the predetermined information) carried out.

Notification of information is not limited to the aspects/embodiments of the present invention, such notification may be carried out via a different method. For example, notification of information may be implemented by physical layer signaling (e.g., DCI (Downlink Control Information), UCI (Uplink Control Information)), higher layer signaling (e.g., RRC (Radio Resource Control) signaling, MAC (Medium Access Control) signaling, broadcast information (MIB (Master Information Block), SIB (System Information Block))), by other signals or a combination thereof. Furthermore, RRC signaling may be called a "RRC message" and may be, e.g., an RRC connection setup (RRCConnectionSetup) message, or an RRC connection reconfiguration (RRCConnectionReconfiguration) message, etc.

The above-described aspects/embodiments of the present invention may be applied to a system that utilizes LTE (Long Term Evolution), LTE-A (LTE-Advanced), SUPER 3G, IMT-Advanced, 4G, 5G, FRA (Future Radio Access), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), or other suitable systems and/or to an enhanced next-generation system that is based on any of these systems.

The order of processes, sequences and flowcharts, etc., in the above-described aspects/embodiments of the present invention can have a switched order so long no contradictions occur. For example, each method described in the present specification proposes an example of an order of various steps but are not limited to the specified order thereof.

Hereinabove, the present invention has been described in detail by use of the foregoing embodiments. However, it is apparent to those skilled in the art that the present invention should not be limited to the embodiment described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

The present application is based on the disclosure of Japanese Patent Application No. 2015-172282, filed on Sep. 1, 2015, and Japanese Patent Application No. 2016-019624, filed on Feb. 4, 2016, the content of which being incorporated herein by reference in their entireties.

The invention claimed is:

1. A terminal comprising:
a processor that determines a same sequence pattern for a plurality of subcarrier spacings of a synchronization signal in a radio access technology (RAT);
a receiver that receives the synchronization signal based on the same sequence pattern,
wherein the processor performs cell search based on the synchronization signal to select a cell; and
a transmitter that transmits a signal on the cell selected based on the cell search.

2. The terminal according to claim 1, wherein the processor performs timing synchronization based on the synchronization signal to acquire a cell ID.

3. The terminal according to claim 2, wherein the synchronization signal is generated with a sequence that is different from a synchronization signal of an LTE system.

4. The terminal according to claim 2, wherein if radio resource allocation of a Physical Downlink Shared Channel (PDSCH) overlaps with a radio resource of the synchronization signal, the processor determines that an overlapped radio resource is not scheduled for the PDSCH.

5. The terminal according to claim 2, wherein if radio resource allocation of a Physical Downlink Shared Channel (PDSCH) overlaps with a radio resource of the synchronization signal, the processor applies rate matching to a radio resource of the PDSCH.

6. The terminal according to claim 2, wherein the receiver receives information about the subcarrier spacing of the synchronization signal.

7. The terminal according to claim 1, wherein the synchronization signal is generated with a sequence that is different from a synchronization signal of an LTE system.

8. The terminal according to claim 7, wherein if radio resource allocation of a Physical Downlink Shared Channel (PDSCH) overlaps with a radio resource of the synchronization signal, the processor determines that an overlapped radio resource is not scheduled for the PDSCH.

9. The terminal according to claim 7, wherein if radio resource allocation of a Physical Downlink Shared Channel (PDSCH) overlaps with a radio resource of the synchronization signal, the processor applies rate matching to a radio resource of the PDSCH.

10. The terminal according to claim 1, wherein if radio resource allocation of a Physical Downlink Shared Channel (PDSCH) overlaps with a radio resource of the synchronization signal, the processor determines that an overlapped radio resource is not scheduled for the PDSCH.

11. The terminal according to claim 10, wherein if radio resource allocation of a Physical Downlink Shared Channel (PDSCH) overlaps with a radio resource of the synchronization signal, the processor applies rate matching to a radio resource of the PDSCH.

12. The terminal according to any one of claim 1, wherein if radio resource allocation of a Physical Downlink Shared Channel (PDSCH) overlaps with a radio resource of the synchronization signal, the processor applies rate matching to a radio resource of the PDSCH.

13. The terminal according to claim 1, wherein the receiver receives information about the subcarrier spacing of the synchronization signal.

14. A radio communication method for a terminal, comprising:
determining a same sequence pattern for a plurality of subcarrier spacings of a synchronization signal in a radio access technology (RAT);
receiving the synchronization signal based on the same sequence pattern;
performing cell search based on the synchronization signal to select a cell; and
transmitting a signal on the cell selected based on the cell search.

* * * * *